(No Model.) 2 Sheets—Sheet 1.
W. M. DIGHT.
SEED PLANTER.
No. 318,705. Patented May 26, 1885.
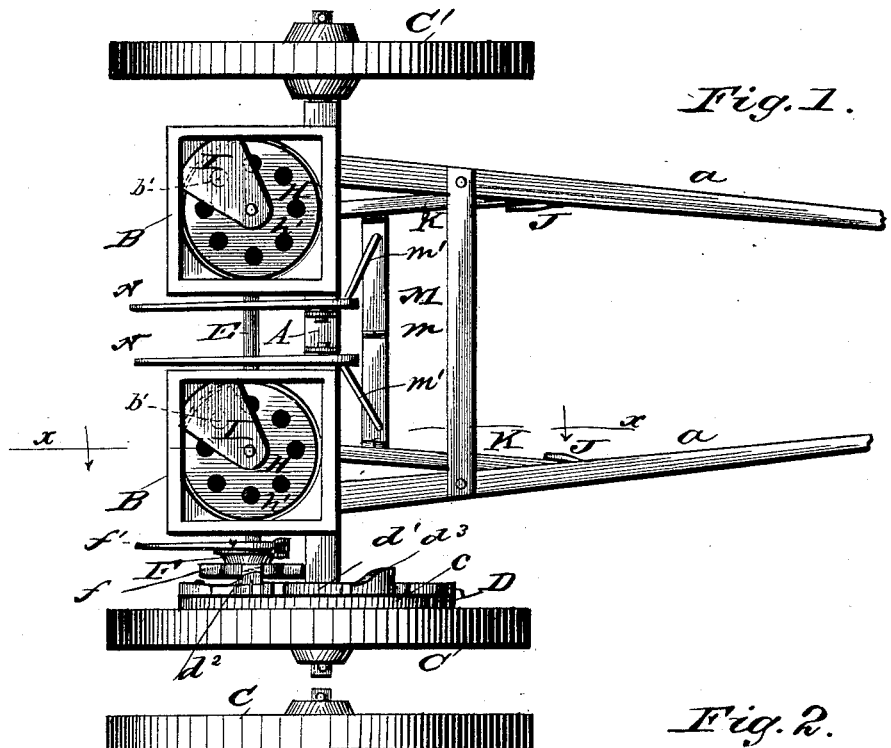
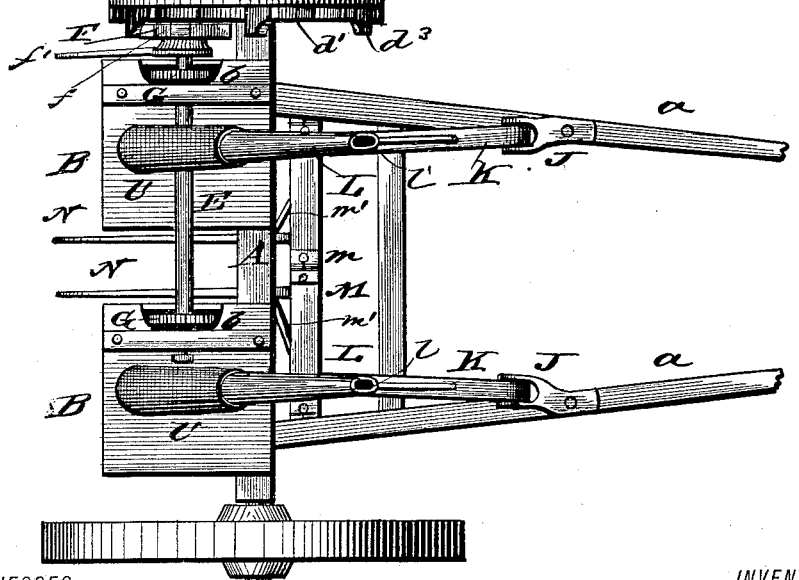
WITNESSES
Phil C. Dieterich
H. R. Keyworth
INVENTOR
Wm. M. Dight
By his Attorney.
J. M. Alexander (No Model.) 2 Sheets—Sheet 2.
W. M. DIGHT.
SEED PLANTER.
No. 318,705. Patented May 26, 1885.
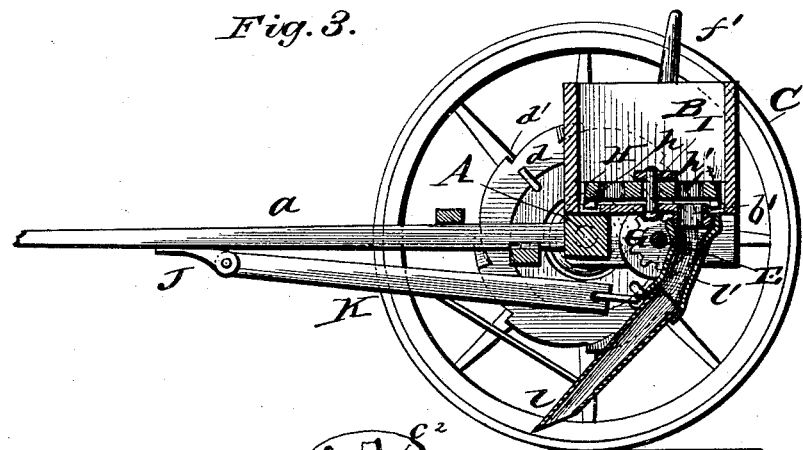
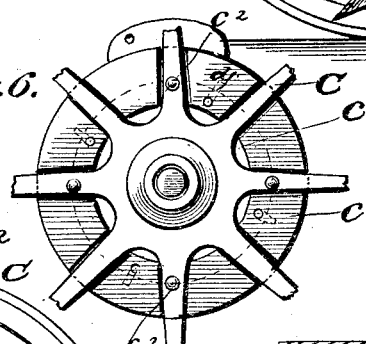
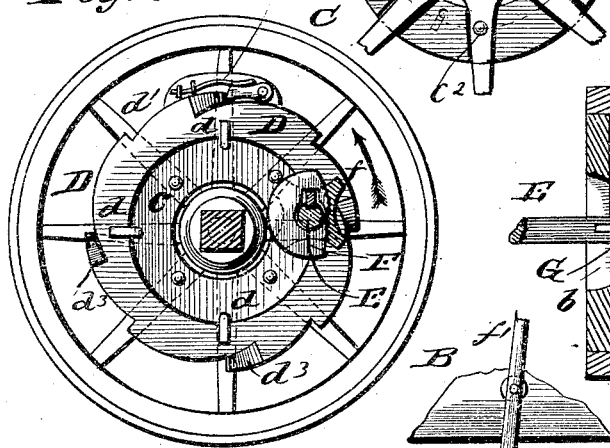
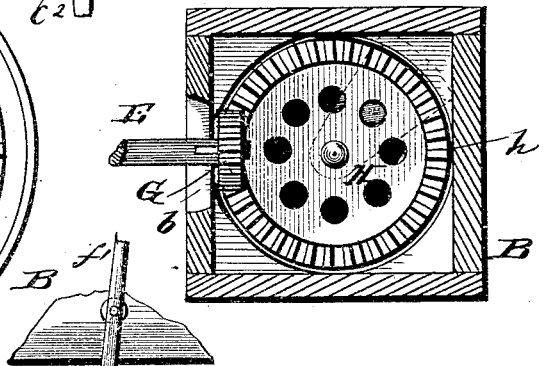
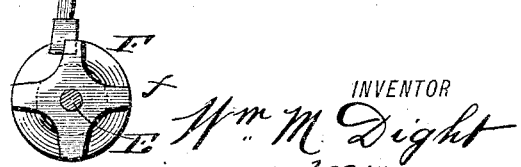
WITNESSES
INVENTOR
Wm M Dight
By his Attorney.

UNITED STATES PATENT OFFICE.

WILLIAM MILLER DIGHT, OF MERCER, PENNSYLVANIA.

SEED-PLANTER.

SPECIFICATION forming part of Letters Patent No. 318,705, dated May 26, 1885.

Application filed December 24, 1884. (No model.)

*To all whom it may concern:*

Be it known that I, WILLIAM M. DIGHT, of Mercer, in the county of Mercer and State of Pennsylvania, have invented certain new and useful Improvements in Seed-Planters; and I do hereby declare that the following is a full, clear, and exact description thereof, reference being had to the accompanying drawings, and to the letters of reference marked thereon, which form part of this specification.

This invention relates to improvements in planters, and has special reference to the mechanism for dropping the grain, its object being to provide simple and efficient means to automatically plant the grain at regular and suitable distances apart.

The general construction of the invention is as follows: Within each of the two seed-boxes is pivoted a disk having a concentric crown-gear on its under surface, and with a number of similar equidistant openings run concentrically around it near its circumference. A transverse shaft having bearings in the frame of the machine to the rear of the axle carries upon it two gear-wheels, each of which meshes with the crown-gear of the said disks through an opening in the bottom of the seed-box. On one end of the shaft, outside its bearing, is feathered or splined a disk cut away on its outer surface, so as to form thereon a number (preferably four) of radial lugs similar and equidistant. To the inner surface of the wheel adjacent to said disk is secured a circular band or ring concentric with the axle and provided with a number of similar equidistant lugs equal to that of the radial lugs on the disk. These lugs stand inward at right angles to the circumference of the ring, and are arranged to strike against and move the radial lugs, thereby partially rotating the transverse shaft, and consequently the disks, within the seed-boxes, successively moving the openings through each of said disks over a discharge-opening in the bottom of the seed-box, through which opening the grain is delivered to the planting device below by means hereinafter described. A shield over the discharge-opening, under which shield the disk rotates, prevents more grain than the openings in the disk contain from passing out of the seed-box. The disks with radial lugs and the disks within the seed-boxes are so arranged with relation to each other that each partial rotation of the former will rotate the latter the distance between two adjacent openings. A pivoted lever attached to the frame of the machine, or to the side of the seed-box, is arranged to slide the disk with radial lugs on the transverse shaft and throw it out of engagement with the ring on the wheel.

The specific construction of parts is hereinafter fully described.

In the drawings accompanying and forming part of this specification, Figure 1 is a top plan view. Fig. 2 is a bottom plan view. Fig. 3 is a vertical section on line $xx$ of Fig. 1. Fig. 4 is a face view of wheel C, showing disk $f$ in engagement therewith. Fig. 5 is a bottom plan view of the disk H. Figs. 6 and 7 are details.

A is the axle of the machine; $aa$, the shafts; B B, the seed-boxes, and C and C' the wheels. $c$ is a metal ring firmly secured to the inside of the wheel C, concentric with the axle, by means of the equidistant lugs or shoulders $c'$ on its outer surface. The spokes of the wheel lie in grooves in the said shoulders, and are retained in place by the screws or bolts $c^2$.

D is a metal ring, lying on the inner surface of the ring $c$, concentric with the axle, and retained in place by the bolts $d$, which screw into the ring $c$, just within the line of the inner circumference of the ring D, and have their outer ends bent outward at right angles upon the inner surface of the latter, so that the same may turn easily upon the ring $c$ without becoming eccentric to the axle.

The outer edge of the ring D is provided with the ratchet-teeth $d'$, by means of which and the spring-controlled pawl $d^2$, pivoted to the ring $c$, the former ring is prevented from turning in a direction contrary to the rotation of the wheels, but may be adjusted upon the ring $c$ in a similar or forward direction.

$d^3$ are lugs, preferably four in number, standing at right angles inwardly from the circumference of the ring D, and equidistant around the same.

E is a transverse shaft, having bearings in the frame of the machine to the rear of the axle and below the seed-boxes.

F is a disk secured by a spline to the end of the shaft E nearest the wheel C, outside of its bearing, and $ff$ are radial lugs, preferably four in number, made on the outer surface of said disk, as described.

$f'$ is a lever pivoted to the frame of the machine, or to the side of the adjacent seed-box, and moving laterally. Its lower end is forked and engages the edge of the disk F, so as to move the latter inwardly on the shaft E and prevent the lugs $d^3$ and $f$ from engaging.

G G are similar gear-wheels, fixed on the shaft E at similar points below the two seed-boxes B, and each meshing through an opening, $b$, in a seed-box, with a crown-gear, $h$, on the lower surface of one of the disks H, pivoted centrally within the seed-box.

$h'$ $h'$ are equidistant openings through the disk H, which openings are arranged near the circumference of the disk and concentric with its central pivot. The floor of the seed-box is provided with a circular recess into which the disk H enters, so that its upper surface is flush with the floor of the box.

I is a plate of metal or other suitable material fixed within the seed-box parallel to and just above the disk. The said plate is of general triangular form, and is fixed at its inner corner to the pivot of the disk and at its outer corners to the floor of the seed-box. The plate stands above the discharge-openings $b'$ in the floor of the seed box and serves to prevent more grain falling through said openings from one of the openings $h'$ than is contained in the latter above the floor of the seed-box.

J J are similar forked brackets fixed to the under surface of the shafts $a$ at similar points, and each having pivoted between the lateral arms of its fork the front end of a bar or rod, K, which runs thence backward and slightly downward, and has fixed to its rear end the upper end of a conical metal tube, L, which inclines forward and downward, and has its lower end beveled upward from front to rear, so as to make a point, $l$, that will easily enter and move forward in the earth as the machine moves.

The tube L is secured to the bar K by a proper brace-rod running upward and forward from the former to the latter, as shown. $l'$ is a tube of rubber or other suitable material connecting the mouth of the tube L with the discharge-opening of the adjacent seed-box.

The two bars K are similar, and are held together and kept in place at proper distance apart by a cross-bar, M, preferably hinged at its ends to the bars K, but which may be made in two sections hinged together at their meeting ends $m$, and having their outer ends connected each with a bar, K, near the mouth of a tube, L.

$m'$ $m'$ are rods or links, each of which connects one of the ends of the bar M to the rear end of a lever, N, the fulcrum of which is on a support rising from the axle near its center.

Each rod $m$ is connected with a separate lever, N, so that the tubes L may, by means of said levers, rods, and hinged bar M, be raised either separately or together.

The method of operation of the machine is as follows: As the wheels rotate forward the lugs $d^3$ on the ring D successively strike the radial lugs $f$ on the disk F and move the latter one-quarter of a revolution each time, there being four lugs of each kind. This motion is communicated by the shaft E and gear-wheels G G to the pivoted disks H, which are arranged to turn the distance between two adjacent openings, $h'$, at each quarter-revolution of the disk F. The grain in the seed-boxes lying in the openings $h'$ is thus carried beneath the plates or shields I, and delivered through the discharge-openings $b'$ in the floors of the seed-boxes into the tubes L by way of the tubes $l'$.

The tubes L have their beveled points in the earth, and deliver the grain from the seed-boxes at regular intervals as the holes $h$ pass over the openings $b'$.

As there are four lugs $d^3$ and an equal number of lugs $f$, the machine makes four equidistant and equal plantings for each revolution of the wheels.

The amount of grain delivered at each planting depends upon the size of the openings $h'$, more grain being delivered when they are large and less when they are small.

To make the plantings closer together the number of lugs $d^3$ and $f$ must be increased.

The ring D is made adjustable on the ring $c$ by means of the ratchet-teeth $d'$ and pawl $d^2$, in order to regulate the point at which to begin the planting, as the lugs $d^3$ may by the said means be so placed as to strike against and move the lugs $f$ sooner or later after the machine begins to move forward.

When it is not desired to plant, as in turning the machine, the disk F is pushed inwardly on the shaft E and the lugs $d^3$ and $f$ prevented from engaging.

The tubes L may then be raised above the ground by pressing the foot on the forward ends of the levers N, or either tube may be raised by pressing similarly on its corresponding lever.

By substituting gear-wheels that mesh together for the ring D and disk F the motion is made continuous, and the corn may be drilled in rows, instead of being planted in hills.

To sow broadcast a gear-wheel is substituted for the ring D and a pinion for the disk F, to mesh with the gear-wheel. A bevel-gear is fixed on the shaft E, and meshes with a similar bevel-gear on a vertical shaft which turns in bearings depending from the frame of the machine. Secured on the vertical shaft and rotated thereby is a disk having its center higher than its circumference, and with its upper surface divided into quadrants by vertical radial flanges which stand from the same.

The disk is so situated that the grain falls upon it from the discharge-opening in the seed-box, and is distributed by its rotation.

Having described my invention, what I claim as new, and desire to secure by Letters Patent, is—

1. In a planter, the combination of the axle A, wheel C, ring c, and ring D, provided with the lugs $d^3$, and circumferentially adjustable on the ring c by means of the bolts d, ratchet-teeth $d'$, and pawl $d^2$, with the disk F, provided with the radial lugs f, and splined on the shaft E, and the lever $f'$, pivoted on the seed-box or frame, with its notched or forked lower end engaging the edge of the disk F, substantially as set forth.

2. In a planter, the combination of the axle A, wheel C, ring c, and ring D, circumferentially adjustable on the ring c, and provided with the lugs $d^3$, with the shaft E, disk F, provided with the radial lugs f, gear-wheel G on the shaft E, and crown-gear h on the lower surface of the disk H, which is pivoted centrally within a seed-box, substantially as specified.

3. In a seed-planter, the combination of the shafts a, bracket J, rods K, and planting-tubes L, with the cross-bar M, provided with the central hinge, m, rods or links $m'$, and levers N, substantially as specified.

In testimony that I claim the foregoing as my own I affix my signature in presence of two witnesses.

WILLIAM MILLER DIGHT.

Witnesses:
  A. B. THOMPSON,
  J. C. MILLER.